United States Patent [19]

Hahn

[11] 4,337,400
[45] Jun. 29, 1982

[54] AUTOMATIC HEADLIGHT CONTROL SYSTEM

[76] Inventor: Thomas J. Hahn, 17 Spruce Rd., North Caldwell, N.J. 07006

[21] Appl. No.: 169,397

[22] Filed: Jul. 16, 1980

[51] Int. Cl.³ .............................................. H02G 3/00
[52] U.S. Cl. ................................... 307/10 LS; 315/82; 340/76
[58] Field of Search ................... 307/10 LS; 361/189; 340/76; 315/82

[56] References Cited

U.S. PATENT DOCUMENTS

| | | | |
|---|---|---|---|
| 3,500,119 | 3/1970 | Price | 315/82 |
| 3,500,120 | 3/1970 | Schultz | 315/82 |
| 3,591,845 | 7/1971 | Vanderpoel et al. | 307/10 |
| 3,600,596 | 8/1971 | Aloisantoni | 307/10 |
| 3,824,405 | 7/1974 | Glaze | 307/10 LS |
| 4,057,742 | 11/1977 | Binegar | 307/10 LS |
| 4,097,839 | 6/1978 | Lesiak | 340/52 R |

Primary Examiner—L. T. Hix
Assistant Examiner—Stafford D. Schreyer
Attorney, Agent, or Firm—Morgan, Finnegan, Pine, Foley & Lee

[57] ABSTRACT

An automatic headlight control system for utilization in conjunction with the ignition system and the windshield wiper system of an automobile is disclosed. The control system utilizes a single switching relay to automatically control the operation of the automobile's headlights when the ignition system and windshield wipers are concurrently activated.

When the automobile ignition is activated, i.e., in the on or running position, the activation of the windshield wiper switch causes the switching relay to be energized thereby automatically activating the headlights; the de-activation of the windshield wiper switch causes the switching relay to be deenergized thereby automatically inactivating the headlights. Turning the ignition switch to the off position causes both the headlights and windshield wipers to be turned off automatically.

3 Claims, 2 Drawing Figures

| IGNITION SWITCH | WIPER SWITCH | RELAY STATE | CONTACTS I/II | HEADLIGHTS/ MARKER LIGHTS |
|---|---|---|---|---|
| OFF | OFF | DE-ENERGIZED | OPEN | OFF |
| ON | OFF | DE-ENERGIZED | OPEN | OFF |
| OFF | ON | DE-ENERGIZED | OPEN | OFF |
| ON | ON | ENERGIZED | CLOSED | ON |

AUTOMATIC HEADLIGHT CONTROL SYSTEM

BACKGROUND OF THE INVENTION

This invention relates to the field of automatic headlight control. More particularly, it relates to a control system for automatically activating a running automobile's headlights whenever the windshield wipers are operating.

In many circumstances it is desirable for the operator of an automobile to utilize the headlights to warn other drivers of his presence. Often, particularly under inclement weather conditions, a driver may find it desirable or necessary to utilize the automobile's headlights during the daytime. Unfortunately, however, many times after the driver has reached his destination he fails to turn off the headlights thereby creating the risk of running down the automobile's battery. Accordingly, a system for automatically controlling the operation of the headlights in conjunction with the activation and deactivation of the windshield wipers is highly desirable.

One approach for solving this problem is disclosed in U.S. Pat. No. 3,500,119. The disclosed system utilizes three switching relays responsive, respectively, to the operation of the wiper motor, the ignition switch, and the headlight dimmer switch for controlling the energization of the low beam headlights and tail lights. However, this approach appears to have several drawbacks. In particular, it utilizes three electromechanical relay switching devices in an attempt to achieve the desired result. Such utilization of multiple switching relays is unnecessarily complex and may have a tendency to increase the risk of failure due to component malfunction. Furthermore, the headlight control system disclosed in the '119 patent could easily cause relay R1 to operate as a shunt across the wiper motor and adversely affect or possibly render inoperative wiper motor operation at various speed settings. Also, the resistance of relay coil R1 would probably have to be carefully designed and matched to the resistance of the particular wiper motor it is to be utilized with. This design requirement is clearly not desirable, particularly when the intended usage includes operation with various motors with varying electrical characteristics mass-produced by many different manufacturers.

What is clearly needed is a simple, reliable and cost-effective system for automatically controlling the operation of a running automobile's headlights when the windshield wipers are activated.

It is accordingly a general object of the present invention to provide an automatic headlight control system which overcomes the aforementioned drawbacks.

It is a specific object of the present invention to provide an automatic headlight control system which is operatively responsive to the concurrent operation of the ignition switch and the windshield wiper switch such that the headlights are automatically turned on/off when the windshield wiper switch is activated/inactivated.

Other objects will be apparent in the following detailed description and the practice of the invention.

SUMMARY OF THE INVENTION

The foregoing and other objects and advantages which will be apparent in the following detailed description of the preferred embodiment, or in the practice of the invention, are achieved by the invention disclosed herein, which generally may be characterized as an automatic headlight control system in combination with an automobile electrical system including a source of voltage, an ignition switch, a windshield wiper switch, and a pair of headlights, wherein the improvement comprises: switching means for connecting said source of voltage to said headlights when said switching means are energized and for disconnecting said source of voltage from said headlights when said switching means are de-energized, wherein said switching means are connected between said ignition switch and said windshield wiper switch and are energized by the concurrent activation of said ignition switch and said windshield wiper switch.

BRIEF DESCRIPTION OF THE DRAWINGS

Serving to illustrate an exemplary embodiment of the invention are the drawings of which.

DESCRIPTION OF PREFERRED EMBODIMENT

Figures 1, 2:
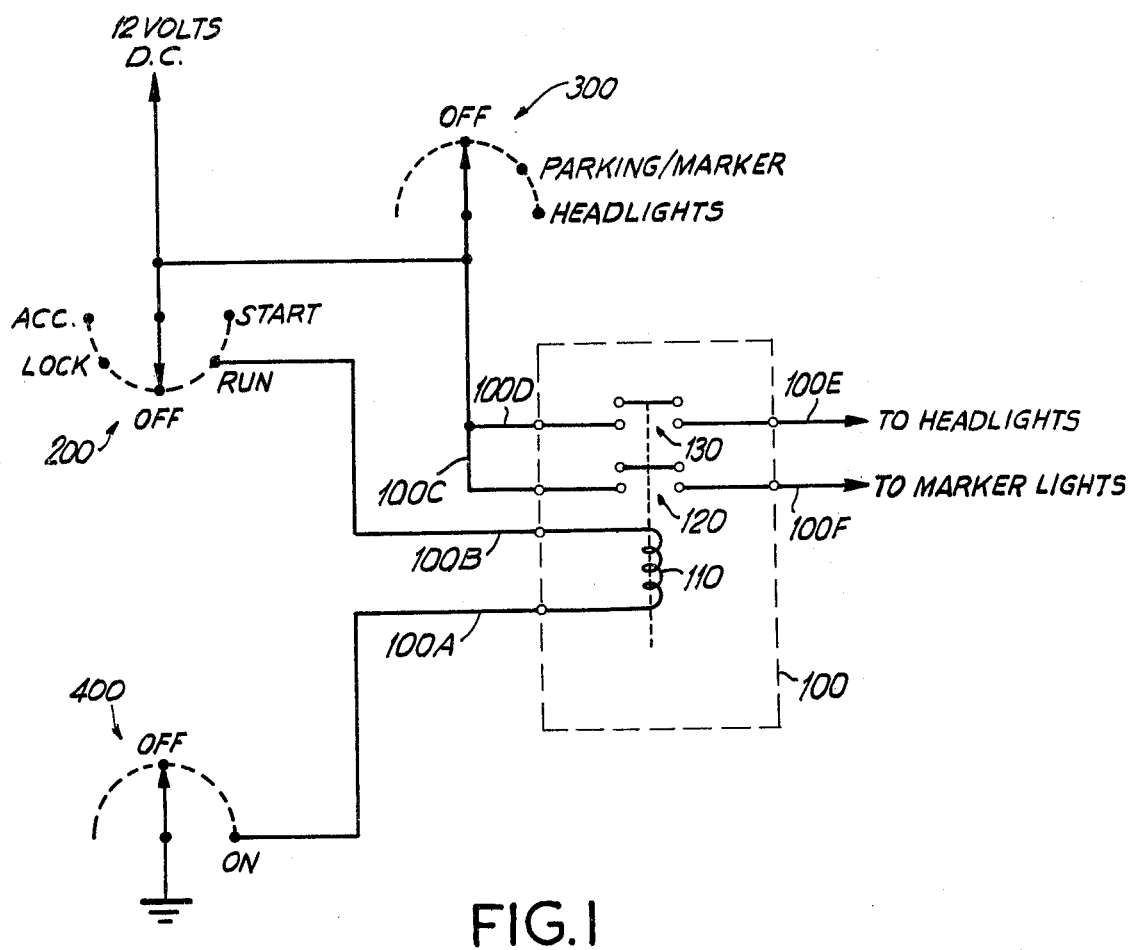
FIG. 1 is a block diagram of the automatic headlight control system.
FIG. 2 is a table illustrating the operative states of the headlights and marker lights as a function of the state of the switching relay.

In order to afford a complete understanding of the invention and an appreciation of its advantages a description of the preferred embodiment is presented below.

Referring to FIG. 1 a block diagram of the automatic headlight control system is illustrated. As shown therein, a switching relay 100 including a winding 100 and first and second sets of contacts 120,130 is operatively connected to a typical automobile electrical system including a 12 volt D.C. source, a system ground, a multi-contact ignition switch 200, a multi-contact headlight switch 300 and a multi-contact windshield wiper switch 400. The switching relay 100 contains six leads designated as 100A, 100B, 100C, 100D, 100E and 100F. Winding 110 is connected in series via leads 100A, 100B between the "on" contact of windshield wiper switch 400 and the "run" (on) contact of ignition switch 200. The first set of contacts 120 is connected in series via leads 100C, 100F between the "off" contact of headlight switch 300 and the marker lights (not shown). The second set of contacts 130 is connected in series via leads 100D, 100E between the "off" contact of headlight switch 300 and the headlights (not shown).

As illustrated in the table in FIG. 2, relay 100 is only energized when both the "run" (on) contact of ignition switch 200 and the "on" contact of windshield wiper switch 400 are concurrently activated. When this condition occurs, lead 100A of relay winding 110 is connected to system ground via the "on" contact of windshield wiper switch 400 and lead 100B of the relay winding is connected to the 12 volt D.C. source via the "run" contact of ignition switch 200 causing current to flow through the winding of relay 100. The flow of current through the relay winding 110 effects closure of the two sets of contacts 120,130 and connects the marker lights and headlights to the 12 volt D.C. source via the "off" contact of headlight switch 300 thus causing them to turn on automatically. When the windshield wipers are turned off, i.e., when the windshield wiper switch 400 is returned to the "off" contact, the relay winding 110 is electrically disconnected from the system ground causing the flow of current through relay 100 to cease. The absence of current flow through the relay winding 110 causes the two sets of contacts 120,130 to open and disconnects the marker lights and headlights from the 12 volt D.C. source thus turning them off automatically.

It is clear that the relay 100, as configured, does not interfere with the normal operation of the headlight switch 300, i.e., the marker lights and headlights may be independently operated by manually activating the appropriate contact on the headlight switch; nor does it interfere with any photosensitive light actuation devices, automatic headlight dimming devices, or time delay devices associated with the lights. Similarly, it also allows operation of the windshield wipers, radio and other accessories with the ignition switch in the accessory position without turning on the headlights.

Although the illustrated embodiment utilizes a switching relay to control the operation of the automatic headlight system of the present invention it is apparent that variations thereof are possible. For example, the relay may be replaced by an appropriate solid state device such as a transistor switch. Similarly, the "hot" side of the relay contacts need not necessarily be connected to a contact on the headlight switch. For example, depending on the manufacturer and model of the automobile being equipped with the automatic headlight control system of the present invention, other 12 volt D.C. points within the automobile's electrical system may be equally safe and convenient. Similarly, if desired, the user may include a fuse or safety device between the ignition switch connection 200 and the relay winding connection 100B.

Accordingly, it is clear that the above description of the preferred embodiment is exemplary and in no way limits the scope of the present invention which is defined by the following claims.

What is claimed is:

1. In combination with an automobile electrical system including a source of voltage, an ignition switch, a windshield wiper switch, a pair of headlights, and a set of marker lights, an automatic headlight control system wherein the improvement comprises:

switching means including energization means and first and second closure means responsive to said energization means for connecting said source of voltage to said headlights and said marker lights when said energization means is energized and for disconnecting said source of voltage from said headlights and said marker lights when said energization means is de-energized, wherein said energization means is connected between said ignition switch and said windshield wiper switch and is energized by the concurrent activation of said ignition switch and said windshield wiper switch, said first closure means is connected between said source of voltage and said marker lights and said second closure means is connected between said source of voltage and said headlights.

2. In combination with an automobile electrical system including a source of voltage, a system ground, an ignition switch having a contact operatively connectable to one of said source of voltage and said system ground, a windshield wiper switch having a contact operatively connectable to the other of said source of voltage and said system ground, and a pair of headlights, an automatic headlight control system wherein the improvement comprises:

relay means including winding means and contact means responsive to said winding means for connecting said source of voltage to said headlights when said winding means is energized and for disconnecting said source of voltage from said headlights when said winding means is de-energized, wherein said winding means is connected between said ignition switch contact and said windshield wiper switch contact and is energized by the concurrent activation of said ignition switch contact and said windshield wiper switch contact, and said contact means is connected between said source of voltage and said headlights.

3. In combination with an automobile electrical system including a source of voltage, a system ground, an ignition switch having a contact operatively connectable to said source of voltage, a windshield wiper switch having a contact operatively connectable to said system ground, a headlight switch having a contact connected to said source of voltage when said switch is inactivated, a pair of headlights, and a set of marker lights, an automatic headlight control system wherein the improvement comprises:

a relay including a winding and first and second sets of contacts responsive to said winding for connecting said source of voltage to said headlights and said marker lights when said winding is energized and for disconnecting said source of voltage from said headlights and said marker lights when said winding is de-energized, wherein said winding is connected in series between said ignition switch contact and said windshield wiper switch contact and is energized by the concurrent activation of said ignition switch contact and said windshield wiper switch contact, said first set of contacts is connected in series between said headlight switch contact and said marker lights, and said second set of contacts is connected in series between said headlight switch contact and said headlights.

* * * * *